United States Patent [19]

Fak et al.

[11] 4,214,230

[45] Jul. 22, 1980

[54] PERSONAL IDENTIFICATION SYSTEM

[76] Inventors: Viiveke Fåk, Ryttaregängen 24, S-58266 Linköping, Sweden; Ingemar B. Ingemarsson, Hedborns gata 2, Linköping, Sweden, S-58249; Rolf Blom, Rydsvägen 318C, Linköping, Sweden; Robert Forchheimer, Braxstigen 5, S-13500 Tyresö, Sweden; Bjorn I. Hellberg, Ettoresg. 3, 58266 Linköping, Sweden

[21] Appl. No.: 870,818

[22] Filed: Jan. 19, 1978

[51] Int. Cl.² .......................... G06K 7/08; G06F 7/06; H04Q 9/00
[52] U.S. Cl. .................................. 340/149 A; 235/380
[58] Field of Search .................. 340/149 A, 146.2; 235/380, 381, 382, 379

[56] References Cited

U.S. PATENT DOCUMENTS

| | | | |
|---|---|---|---|
| 3,862,716 | 1/1975 | Black et al. | 340/149 A |
| 3,956,615 | 5/1976 | Anderson et al. | 340/149 A |
| 3,990,558 | 11/1976 | Ehrat | 340/149 R |
| 4,004,089 | 1/1977 | Richard et al. | 340/149 A |
| 4,023,012 | 5/1977 | Ano et al. | 340/149 A |
| 4,025,905 | 5/1977 | Gorgens | 340/149A |
| 4,123,747 | 10/1978 | Lancto et al. | 340/149 A |

OTHER PUBLICATIONS

"Password Generation for Encrypting by Exclusive OR'ing", J. F. Soldini, *IBM Technical Disclosure Bulletin*, vol. 14, No. 2, Jul. 1971, pp. 576, 577.

*Primary Examiner*—Donald J. Yusko
*Attorney, Agent, or Firm*—Owen L. Lamb

[57] ABSTRACT

A method and apparatus for verifying that the bearer of a card (e.g., credit card, bank card, etc.) is authorized to use the card. The card bears machine-readable indicia of an account number (PAN) and the bearer of the card has memorized a personal identification number (PIN). There is associated with the PAN a check number (PCN) which is derived by (1) generating a first cipher Y1 by encrypting the PAN using the PIN in combination with a secret security number as a key, the bits of which address a data encryption process; (2) generating a second cipher by decrypting the first cipher using the secret security number as a key so that the decryption process is the reverse of the encryption process; and (3) storing the second cipher as the check number PCN in a machine-accessible location, which may be in a separate memory or recorded on the card itself.

Verification is accomplished by (a) sensing the PAN from the machine-readable indicia on the card; (b) enciphering the PAN with respect to the data encryption process under control of a key which is a combination (such as by addition) of the PIN and the secret security number to thereby produce a third cipher; (c) sensing the PCN from the machine-accessible location; (d) enciphering the PCN with respect to the data encryption process under control of a key which is the secret security number to thereby produce a fourth cipher; and (e) accepting the card as valid provided the third and fourth ciphers bear a predetermined relationship to each other, such as equality.

11 Claims, 6 Drawing Figures

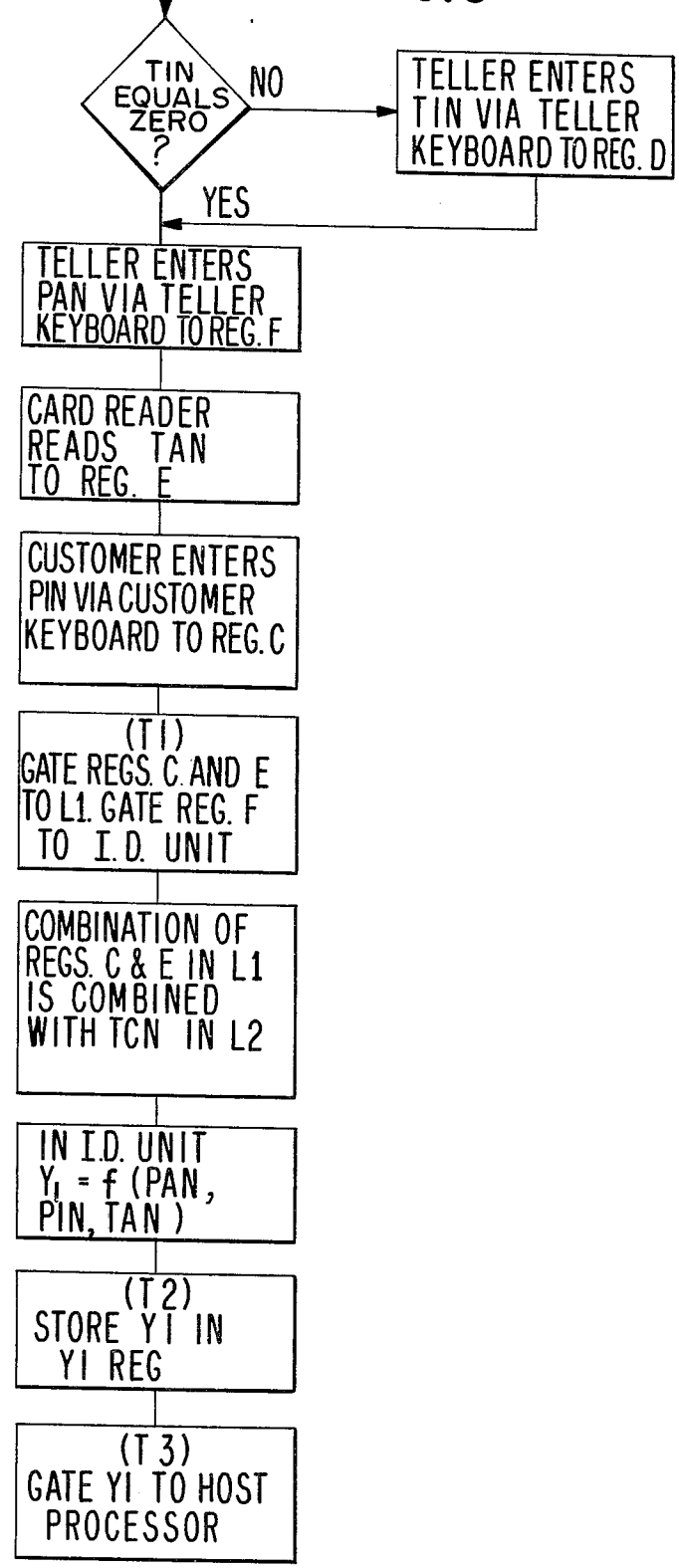

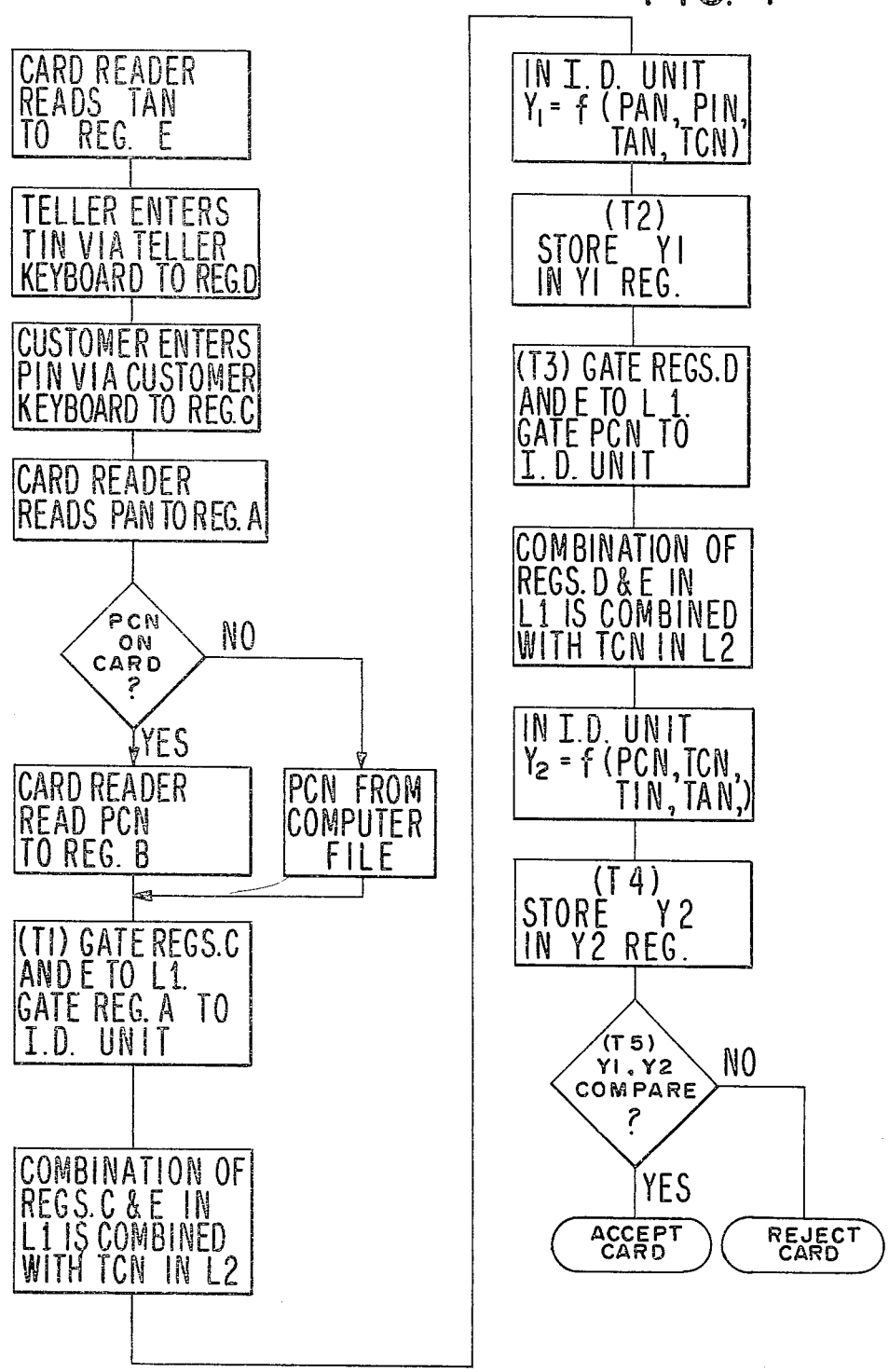
IDENTIFICATION MODE (USING TIN & TAN) — FIG. 4

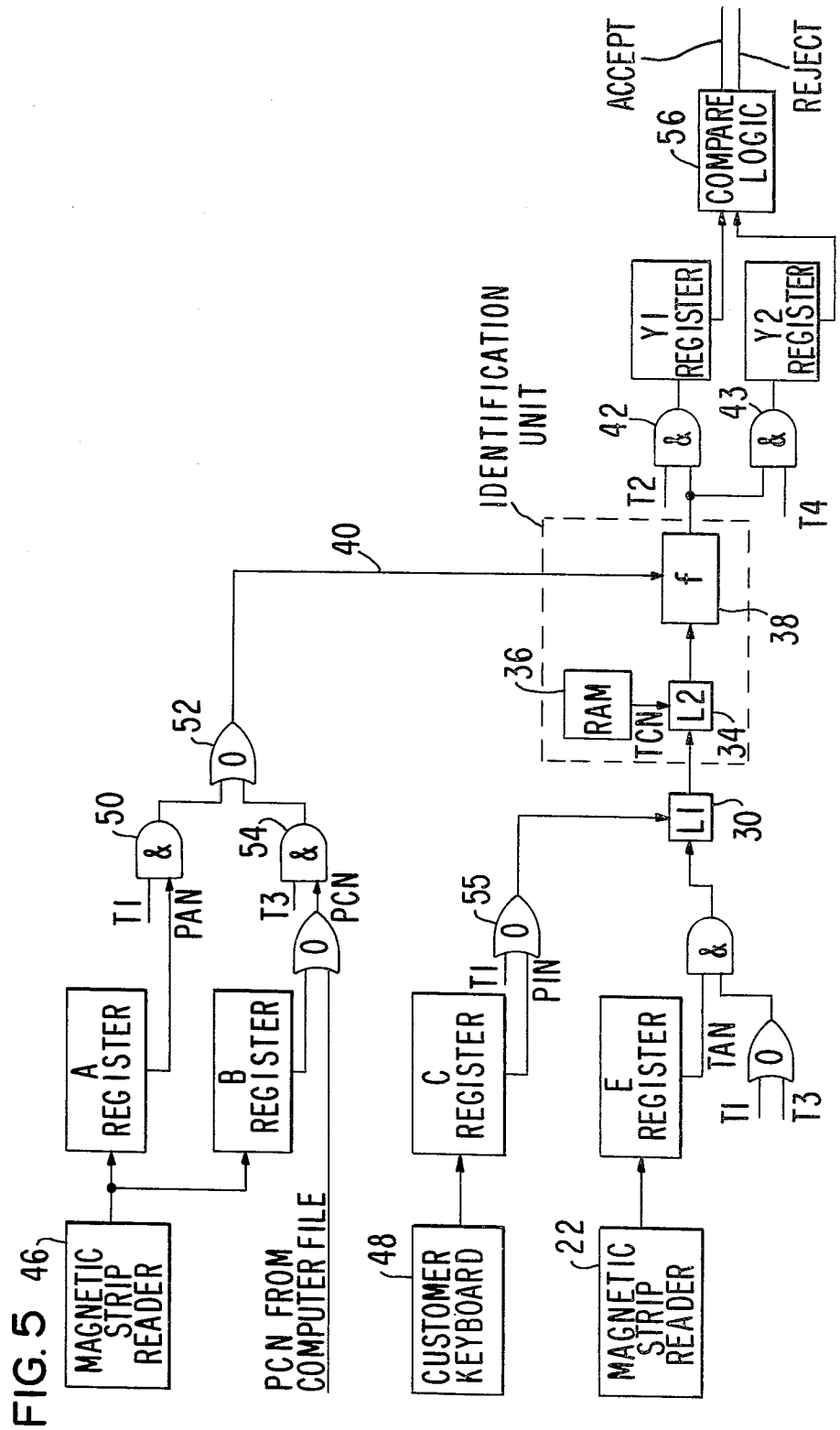

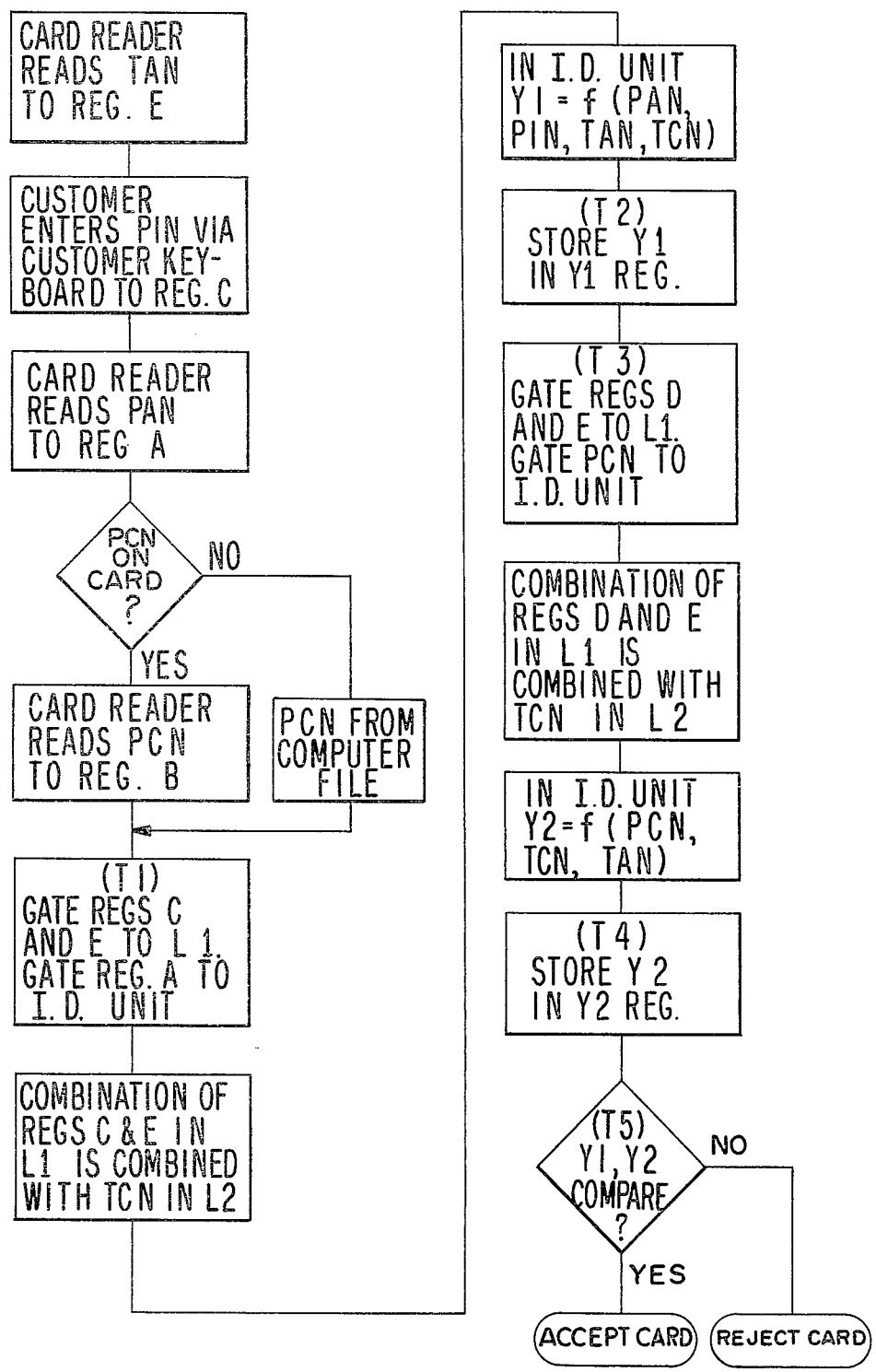

PERSONAL IDENTIFICATION SYSTEM

BACKGROUND OF THE INVENTION

1. Field of the Invention

This invention relates to personal identification systems and more particularly to such systems wherein a personal identification number known only to the bearer of a card and a number on the card are utilized for identifying the bearer.

2. Description of Prior Art

Personal identification systems utilizing an account number read from a credit card and a personal identification number (PIN) known only by the authorized bearer of the card are well known in prior art. For example, in U.S. Pat. No. 3,657,521, which issued to Jeffrey Constable on Apr. 11, 1972, on an application filed Aug. 24, 1970, there is disclosed a system in which a linearfeedback shift register is utilized to encode an account number onto a credit card. The account number is a predetermined function of the secret personal identification number. When a customer wants to make a transaction, identification is accomplished by comparing the keyed-entry of the personal identification number with the account number read from the credit card. The account number is translated by an enciphering unit before the comparison with the keyed-in personal identification number. The translation involves filling a shift register which is provided with feedback to adders so as to generate the digits of a translated number successively. The translated number is compared with the corresponding digits of the keyed-in personal identification number. Since the translation is the reverse of the enciphering process which recorded the number originally on the card, the translated number should correspond to the personal identification number.

While the personal identification number cannot be derived from the number recorded on the credit card without having access to the translating circuitry, it is possible that a criminal could obtain information about the translating circuitry and thus be able to derive the personal identification numbers from stolen credit cards.

Another prior approach is that disclosed in U.S. Pat. No. 3,938,091 which issued on Feb. 10, 1976 to Martin Atalla on an application filed July 19, 1974. In this patent an individual code word or account number is combined with a secret code word or PIN memorized by the card holder to produce a compiled code word. The compiled code word is stored for subsequent use in personal identification. During personal identification the individual code word is read from the credit card and the PIN is inputted by the card holder, the two code words being passed through the encoder to generate the compiled code word. The compiled code word thus generated is compared with the previously stored compiled code word. If the two compare the transaction is authorized.

This approach, while providing more security than the previous approach, is also subject to tampering by criminals which might gain access to the list of compiled code words or to the circuitry for performing the encoding operation.

SUMMARY OF THE INVENTION

The primary object of the present invention is to provide an improved personal identification system which is resistent to discovery of the encoding process by which identification is made.

Briefly, in accordance with the invention, an account number (PAN) is assigned to a cardholder and is recorded on the card. The cardholder is also assigned a personal identification number (PIN) which is maintained secret. A check number (PCN) is derived by generating a first cipher Y1 by encrypting the PAN using the PIN in combination with a first secret security number as a key, the bits of which address a data encryption process. A second cipher Y2 satisfying a predetermined relationship between Y1 and Y2 is then computed. A check number (PCN) is generated by decrypting the second cipher using a second secret security number as a key so that the decryption process is the reverse of the data encryption process. The PCN is stored in a machine-accessible location, such as in a separate memory or is recorded on the card.

Verification is performed by the following method. The PAN read from the card is enciphered with respect to the data encryption process under control of a key which is a combination of the PIN and the first secret security number to thereby produce a cipher Y1. The PCN is then enciphered with respect to the data encryption process under control of a key which is the second secret security number to thereby produce the cipher Y2. The results Y1 and Y2 are then compared to see if the predetermined relationship exists.

In accordance with one aspect of the invention the first and second security numbers are the same.

In accordance with a further aspect of the invention the secret security numbers, in a banking or a similar situation, are derived as follows. A bank teller is supplied with a teller identification number (TIN) and is assigned an authorization number (TAN). The first secret security number is a combination of the TAN and a bank check number (TCN) when enciphering to produce Y1. The second secret security number is a combination of TIN, TAN and TCN when enciphering to produce Y2.

The invention has the advantage of being able to utilize a standard encryption process and still resist criminals. The combination of a secret check number together with the data encryption process can be packaged in a device in such a way that anyone tampering with it will destroy the secret number, thus rendering the circuit useless and defeating any efforts to determine the secret number.

A further advantage of the invention is that a person with knowledge of all the secret numbers (TIN, PAN, PIN, PAN and PCN) cannot compute the check number (TCN), nor can any one of the secret numbers be computed with knowledge of all the other numbers.

BRIEF DESCRIPTION OF THE DRAWINGS

The foregoing and other objects, features, and advantages of the invention will be apparent from the following detailed description of preferred embodiments of the invention as illustrated in the accompanying drawings wherein:

FIG. 3 is a data flow chart illustrating the operation of the logic of FIG. 1, in the "open new account" mode of operation;

FIG. 4 is a data flow chart illustrating the operation of the logic of FIG. 1 in the "identification" mode of operation;

FIG. 5 is a block diagram of a second embodiment of the invention wherein teller security has been eliminated; and, FIG. 6 is a data flow chart illustrating the operation of the logic of FIG. 5.

DESCRIPTION

Figures 1, 2:
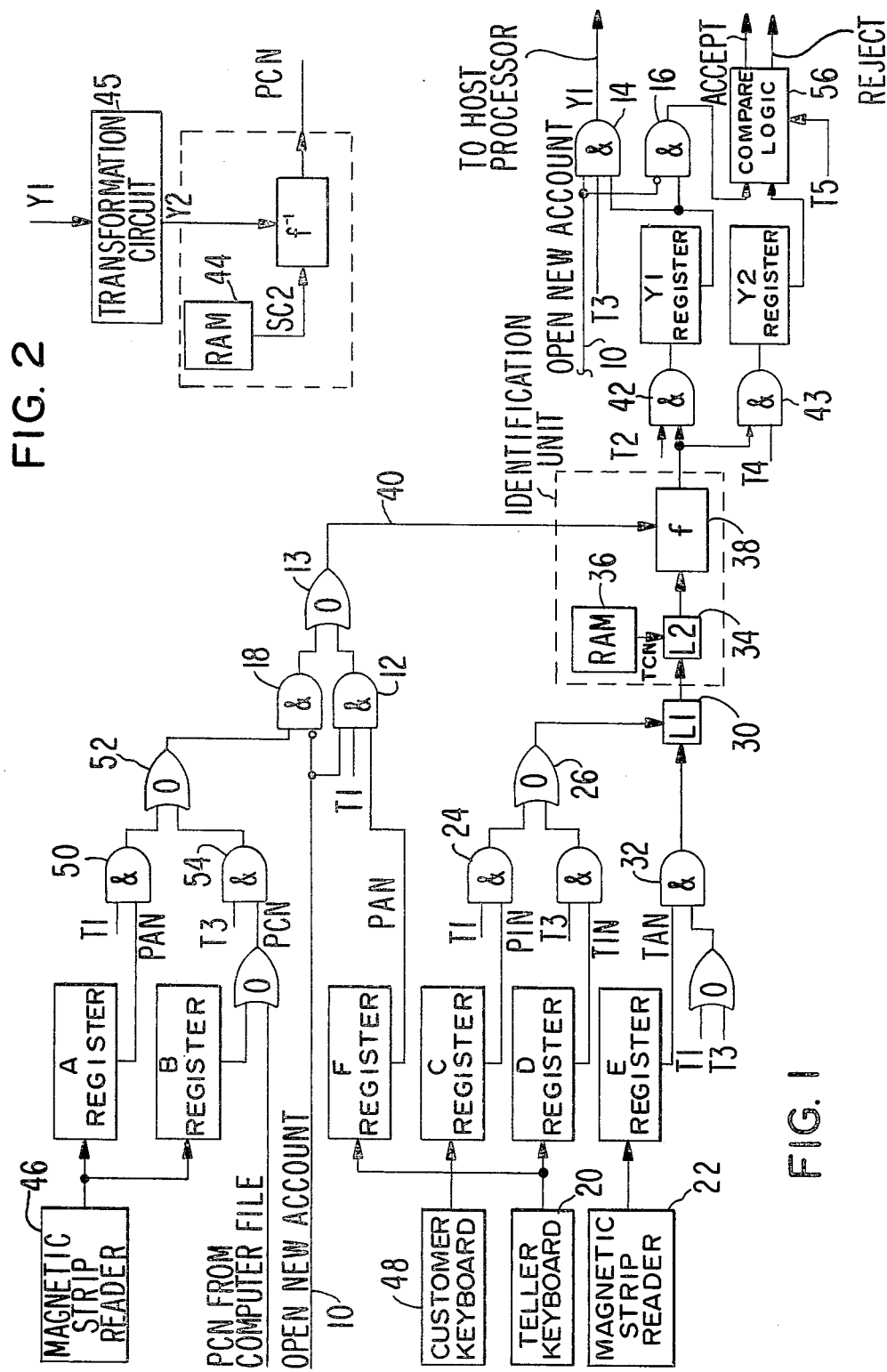
FIG. 1 is a block diagram of a first embodiment of the invention.
FIG. 2 is a block diagram of circuitry in a host processor for generating the personal check number PCN.

The following description of an embodiment of the invention is specific to a banking situation wherein a person carries a bank credit card. It should be understood, however, that the principles of the invention can be applied to similar situations in other industries wherein a business transaction is to take place between a person and a commercial institution.

First, a person is assigned a personal identification number (PIN). This number is memorized to prevent criminal misuse of the credit card. A bank credit card is utilized which has a magnetic strip for recording information. A personal account number (PAN) is assigned and stored on the magnetic strip. A check number (PCN) is derived and is also stored on the magnetic strip. Alternatively, the PCN can be stored in a customer file in computer memory. The combination of numbers PIN, PAN, and PCN are unique for one person.

In one embodiment of the invention the tellers have their own cards with an authorization number (TAN) and as extra security a teller identification number (TIN).

A terminal is provided which has keyboard inputs and card readers for sensing the information recorded on the magnetic strip of a card. In the terminal is an identification unit which includes a memory in which is stored a secret check number (TCN), and a data encryption circuit. The encryption circuit converts clear data to encrypted data depending on the bit configuration of an input referred to as the key input. The decrypting process is the reverse of the encrypting process. Circuits for accomplishing this are well known in the prior art, for example, those designed to meet the Data Encryption Standard issued by the U.S. Department of Commerce, National Bureau of Standards, more fully described in Federal Information Processing Standards Publication 46 issued on Jan. 15, 1977.

Prior to going through an identification process the PCN is generated by the host computer. This is accomplished when a new account is opened. The customer's account number (PAN) is passed through the data encryption circuit using a first secret number (a combination of PIN, TAN and TCN) as a key, the result being a first cipher Y1. The second cipher Y2 satisfying the predetermined relationship between Y1 and Y2 is then computed. The second cipher, Y2 is then passed through the reverse of the enciphering process using an appropriate key (a combination of TIN, TAN and TCN), the result being the customer's check number PCN. The account number PAN and the check number PCN are then placed in a machine-accessible location, such as stored in a memory or recorded on the credit card.

Customer identification is accomplished as follows. The customer keys-in the personal identification number (PIN). The terminal reads the card and the following two-step process is performed:

1. The cardholder's account number (PAN) is enciphered using a key which includes teller security data (TAN) combined with the bank check number (TCN) and the cardholder identification data (PIN) to provide an intermediate result Y1;

2. The cardholder check number (PCN) is enciphered using a key which includes teller security data (TAN) combined with the bank check number (TCN) and teller identification data (TIN) to provide another intermediate result Y2;

3. The results Y1 and Y2 are compared and if the predetermined relationship is satisfied, the transaction is approved.

Referring now to the drawings, the invention will be described in more detail. In FIG. 1 there is shown a block diagram of an identification system including the circuitry for opening a new account and provisions for teller security. In order to open a new account, the new account line 10 is energized which activates AND circuits 12, 14, and 16, and deactivates AND circuit 18. Referring also to FIG. 3 the logic flow is as follows. The teller enters the teller identification number (TIN) by means of the teller keyboard 20 and the TIN is stored in the D register. Alternatively, TIN may be set to zero, in which case the teller need not perform the preceding entry step. Next the teller enters the personal account number (PAN) by means of the teller keyboard and this is stored in the F register. The teller inserts his card into the magnetic strip reader 22 and the card reads the teller authorization number (TAN) from the magnetic strip and this number is stored in the E register. The customer now enters the PIN via the customer keyboard, and PIN is stored in register C.

At time T1 the contents of the C register are gated by AND circuit 24 through OR circuit 26 to a combinatorial logic circuit (L1) 30, by way of example, but not limited to, a modulo-two adder. Simultaneously the contents of the E register are gated through AND circuit 32 to the same L1 circuit 30. The combination of the registers C and E is combined with the control number TCN from RAM 36 by means of combinatorial logic circuit (L2) 34 and the result becomes the key input to the data encryption circuit 38. Simultaneously the data input 40 has the contents of the F register gated to it through AND circuit 12 and OR circuit 13. At time T2 the output of the data encryption circuit is gated by means of AND circuit 42 to the Y1 register. At time T3 the cipher Y1 is gated via AND circuit 14 to the host processor, shown partially in FIG. 2.

Referring to FIG. 2, in the host processor there is an identification unit similar to the one shown in FIG. 1. The cipher Y1 is placed on the data input of a transformation circuit 45. The transformation circuit transforms cipher Y1 to a cipher Y2 bearing a predetermined relationship to Y1. If Y1 is to be equal to Y2, the circuit 45 is unnecessary. The inverse of the function 38 of FIG. 1 is obtained by utilizing an altered key which is the same key as used for enciphering, so that the deciphering process is the reverse of the enciphering process. This altered key is signified by the notation SC2 in FIG. 2 and is held secret in a RAM 44. If the Data Encryption Standard is to be met, procedures for calculating the reverse key are described in the above-identified Data Encryption Standard. As a practical matter the identification unit of FIG. 1 and the identification unit of FIG. 2 can be the same since only the contents of the RAM have to be accessed differently in order to get the inverse function. The result of this operation is that the PCN is generated and is stored on the magnetic strip of the customer's bank card or in a computer memory.

Customer identification is accomplished as follows. The customer places the bank card into the magnetic strip reader and the PAN is read into the A register and the PCN is read into the B register. The customer then enters the personal identification number (PIN) via a customer keyboard 48 and this number is stored in the C register. The teller inputs the teller identification number via teller keyboard 20, which number is stored in the D register. The teller's card is read by the magnetic strip reader 22 and the TAN is stored in the E register.

At time T1 registers C and E are gated to the logic circuit 30 and register A is gated via AND circuit 50 and OR circuit 52 through AND circuit 18 and OR circuit 13 to the data input 40 of the identification unit. The logical combination of registers C and E at the logic circuit 30 is combined with the TCN in combinatorial circuit (L2) 34 within the identification unit and the output of this becomes the key input to the data encryption unit 38. The result is an output Y1 which at time T2 is gated through AND circuit 42 to the Y1 register.

The next step in the process occurs at time T3. The contents of the D and E registers are gated to the logic circuit 30 and the contents of register D are gated to the data input 40 of the identification unit. The logical combination of registers D and E is combined with the TCN read from RAM 36 at the logical circuit 34 to generate the key input to the data encryption circuit 38. The cipher Y2 is generated at the output of encryption circuit 38. At time T4, Y2 is gated through AND circuit 43 and stored in the Y2 register. Since the open new account line 10 is now disenergized, the AND circuit 16 is energized and the output of the Y1 register is now passed to the compare logic 56. At time T5 the compare logic is energized to compare Y1 and Y2, in accordance with the relationship established by transformation circuit 45, and if they compare, the accept line is energized. If they do not compare, the reject line is energized. This completes the identification process.

An alternative embodiment of the invention is shown in FIG. 5. Here the TIN is eliminated. Also the circuit illustrates how the PCN could be stored in a computer file rather than read from the magnetic card. Referring to the data flow of FIG. 6, the identification mode without teller security is as follows. The following description assumes that the open new account mode, with TIN equal to zero, was previously followed. The customer enters the PIN by means of the customer keyboard 46 and this is stored in the C register. The bank card is read by the magnetic strip reader 46 and the PAN is stored in the A register while the PCN is stored in the B register or is received from a computer file. At time T1 the contents of the C register are gated via AND circuit 55 to the L2 circuit 34. At the same time the contents of the A register are gated via AND circuit 50 and OR circuit 52 to the data input 40 of the identification unit. The PIN is added to TCN in the identification unit and the output of the data encryption circuit 38 is the cipher Y1 which at time T2 is stored in the Y1 register.

The next step in the process occurs at time T3 when the contents of the C register are again gated to the L2 corciot 34. Now, however, the PCN is gated via AND circuit 54 to the data input 40 of the data encryption unit 38. The output of the identification unit is the cipher Y2 which at time T4 is gated via AND circuit 43 to the Y2 register. At time T5, Y1 and Y2 are compared in the compare logic 56 and if the predetermined relationship is satisfied, the card is accepted as valid.

It should be understood that TAN need not be entered from a card reader, but can be stored in a separate memory. In this case TAN can be thought of as an extra control number in addition to TCN.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. For use in a system for providing transaction security to a cardholder's account in a commercial institution, wherein the cardholder has a secret identification number, and the institution has a secret number, the combination comprising:
   means having a data input, a data output and a key input, for enciphering clear data applied at said data input under control of a key comprised of key bits applied at said key input, in accordance with an enciphering process;
   means for applying a customer account number to the data input of said enciphering means; and,
   means for applying at the key input the combination of said customer's secret number and said institution's secret number,
   whereby a first cipher is generated at the output of said enciphering means.

2. The combination in accordance with claim 1 further comprising:
   means having a data input, a data output, and a key input for deciphering ciphered data using an altered key so that the deciphering process is the reverse of said enciphering process;
   first means for applying said first cipher to said data input of said deciphering means; and,
   second means for applying at said key input of said deciphering means said institution's secret number, altered so that the deciphering process is the reverse of said enciphering process,
   whereby a customer check number is generated at the output of said deciphering means.

3. The combination in accordance with claim 2 wherein said first means includes means for transforming said first cipher into a second cipher bearing a predetermined relationship to said first cipher.

4. Apparatus for verifying the authenticity of a customer possessed of a secret identification number, machine-readable indicia of an account number and a customer check number bearing an encrypted relationship to said identification number, said encrypted relationship being further the function of a secret bank number, comprising:
   means having a data input, a data output, and a key input, for enciphering clear data applied at said data input, under control of a key applied at said key input, in accordance with an enciphering process;
   means for applying said customer's account number to said data input;
   means for applying at said key input the combination of the secret identification number and said secret bank number,
   whereby a first cipher Y1 is obtained at said data output;

means for applying said customer check number to said data input;

means for applying at said key input said secret bank number, whereby a second cipher Y2 is obtained at said data output; and, means for comparing said first and second ciphers, whereby verification depends upon said ciphers bearing said predetermined relationship to each other.

5. For use with a card bearing machine-readable indicia of an account number (PAN) and wherein an authorized user of said card has memorized a personal identification number (PIN), and wherein there is associated with said PAN a check number (PCN) which is derived by (1) generating a first cipher Y1 by encrypting said PAN using said PIN in combination with a first secret security number as a key, the bits of which address a data encryption process; and (2) generating a check number (PCN) by decrypting said first cipher using a second secret security number as a key so that the decryption process is the reverse of said data encryption process; and (3) storing said check number (PCN) in a machine-accessible location, the method of verifying that the bearer of said card is authorized to use said card comprising the steps of:

(a) Sensing said PAN from said machine-readable indicia on said card;

(b) Enciphering said PAN with respect to said data encryption process under control of the key which is a combination of said PIN and said first secret security number to thereby produce a third cipher;

(c) Sensing said PCN from said machine-accessible location;

(d) Enciphering said PCN with respect to said data encryption process under control of said key which is said second secret security number to thereby produce a fourth cipher;

(e) Comparing said third and fourth ciphers; and, (f) Accepting said card as valid providing said third and fourth ciphers compare favorably with each other.

6. The method in accordance with claim 5 comprising the further step, following step (a), of entering said PIN via a customer keyboard.

7. The method in accordance with claim 5 wherein said first cipher Y1 is transformed in accordance with a predetermined relationship into a second cipher Y2, said second cipher being used in place of said first cipher to generate said PCN, and wherein in step (f) said card is accepted as valid providing said third and fourth ciphers bear said predetermined relationship to each other.

8. The method in accordance with claim 5 wherein said first and second secret security numbers are identical.

9. The method in accordance with claim 5 wherein said first secret security number is a combination of a teller authorization number (TAN) and a bank control number (TCN) and said second secret security number is a combination of a teller identification number (TIN), said teller authorization number (TAN) and said bank control number (TCN).

10. The method in accordance with claim 5 where said machine-accessible location for storing said PCN is a random access memory.

11. The method in accordance with claim 5 wherein said machine-accessible location for storing said PCN is on said card.

* * * * *

UNITED STATES PATENT AND TRADEMARK OFFICE
CERTIFICATE OF CORRECTION

PATENT NO. : 4,214,230
DATED : July 22, 1980
INVENTOR(S) : Fak, et al.

It is certified that error appears in the above-identified patent and that said Letters Patent are hereby corrected as shown below:

In the drawings, sheet 5, FIG. 6, the block labeled "(T3) GATE REGS D AND E TO L1. GATE PCN TO I.D. UNIT" should read --(T3) GATE REGS C AND E TO L1. GATE PCN TO I.D. UNIT--; and the block labeled "COMBINATION OF REGS D AND E IN L1 IS COMBINED WITH TCN IN L2" should read --COMBINATION OF REGS C AND E IN L1 IS COMBINED WITH TCN IN L2--;

Column 4 line 20, which reads "cuits 12, 14, and 16, and deactivates AND circuit 18." should read --cuits 12, 14, and deactivates AND circuits 16 and 18.--;

Column 5, line 51, change "46" to --48--.

Signed and Sealed this

Twenty-eighth Day of July 1981

[SEAL]

Attest:

Attesting Officer

GERALD J. MOSSINGHOFF

Commissioner of Patents and Trademarks